(No Model.)

W. R. FEE.
PULLEY.

No. 379,946. Patented Mar. 27, 1888.

Attest.
W. P. Gulick,
W. C. Christopher.

Inventor.
William R. Fee,
per Wm. Hubbell Fisher,
Atty.

N. PETERS, Photo-Lithographer, Washington, D. C.

UNITED STATES PATENT OFFICE.

WILLIAM R. FEE, OF CINCINNATI, OHIO, ASSIGNOR TO THE WILLINGHAM LUMBER COMPANY, OF CHATTANOOGA, TENNESSEE.

PULLEY.

SPECIFICATION forming part of Letters Patent No. 379,946, dated March 27, 1888.

Application filed November 19, 1886. Serial No. 219,343. (No model.)

*To all whom it may concern:*

Be it known that I, WILLIAM R. FEE, a resident of Cincinnati, Hamilton county, Ohio, have invented certain new and useful Improvements in Pulleys, of which the following is a specification.

The several features of my invention and the various advantages resulting from their use, conjointly or otherwise, will be apparent from the following description and claims.

My invention may be applied to either split pulleys or to solid pulleys.

Figure 1:
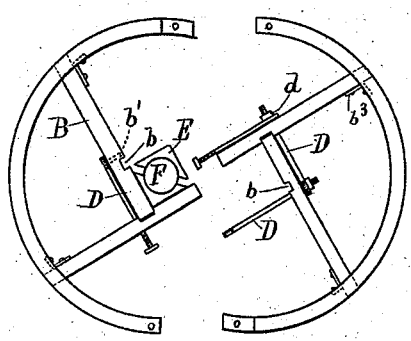
Figure 2:
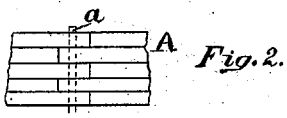
Figure 3:
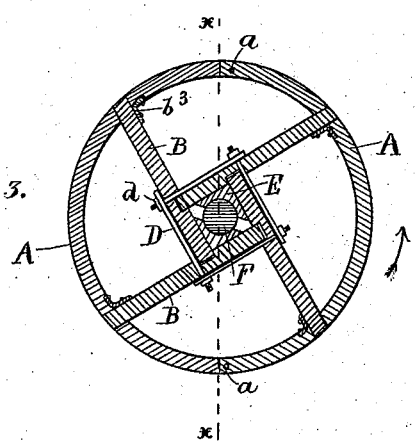
Figure 4:
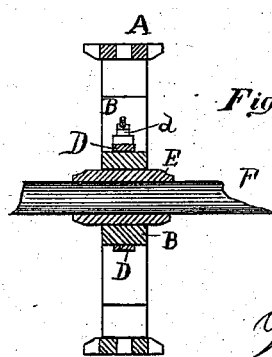

In the accompanying drawings, Figure 1 shows a split pulley embodying certain features of my invention, the two parts of the pulley being separated. Fig. 2 is an edge view of a pulley, showing a method of uniting the two parts of the pulley when split. Fig. 3 is a central vertical section of the split pulley and shaft shown in Fig. 1. Fig. 4 is a cross-section taken at the line X X of Fig. 3.

As shown in the drawings, the arms of the pulley do not coincide with radii of the circular rim, but pass to the side of the center, forming a polygonal space surrounding the center. The arms are preferably four in number, and preferably so arranged as to make the center figure a square.

The pulley may be made of either wood or iron. When made of wood, the form shown in Figs. 1 to 4, inclusive, is preferred. The parts of the rim A, when the pulley is split, are preferably secured together, as shown in Fig. 2, by an interlocking of tongues and grooves on one part of the rim with corresponding tongues and grooves on the other part, and the parts so united are firmly held in place by the cross-pin $a$, passing through a perforation in the overlapping tongues of the rim from side to side thereof. In large pulleys the connection between the arms B and the rim is preferably strengthened by the angle-irons $b^3$, one part of which is fastened by bolts or screws to the arm B and the other part secured in a recess in the rim A.

Each arm B is provided with a recess, $b$, to receive the end of one of the other arms. Each arm is also provided with an opening, $b'$, through which the end of one of the straps D is passed. The small end of the strap D as it projects beyond the arm has the opening of the next strap D slipped over it and secured in place by the nut $d$. The four straps are united to each other in this manner, as shown in Fig. 3, forming a tight band encompassing the hub, and also a band which may be either tightened or loosened.

The bushings E have each a curved surface to fit the shaft F and two surfaces at right angles to form a square to engage with the corners of the square hub formed by the arms B. By these means loosening each opposite strap one-sixteenth of an inch expands the rectangle inclosing the bushing or sleeve E in the direction of the axes of said straps one-eighth of an inch—that is, to double the distance which each strap is loosened—*i. e.*, lengthened—and vice versa. The spring of the arms makes this movement practicable even where the rim of the pulley is a solid one, and where the outer ends or end portions of the arms are rigidly attached to the rim or periphery of the pulley. Such an expansion as above mentioned is sufficient to release the split bushing E from the grasp of the clamp embracing it, and the pulley can then be readily removed or slid along the shaft.

The fact that the clamp and the bushing are polygonal in shape where they meet one another prevents the bushing from working loose in the clamp and from slipping out of the clamp. This combination of clamp and split bushing enables the same pulley to be applied successively to shafts of various diameters by changing the bushing only. I thus dispense with the necessity of a separate pulley for each different size of shaft.

When a wooden split rim is employed, the parts are applied to the shaft as shown in Fig. 1. When a solid rim of metal or wood is used, the pulley, with the bushings removed, is first slipped on the shaft. Then the nuts $d$ are loosened, affording room for the hub to expand when the bushings are put in place. The nuts $d$ are now tightened and rigidly clamp the pulley to the shaft.

The peculiar arrangement of the arms B forms a bracing for the rim of the pulley, which adds very materially to its strength. Another advantage of this pulley is, that the arms of the pulley do not set up any marked current of air. Especially is this true when the pulley turns in direction indicated by the arrow in Fig. 3.

Certain modifications of my invention are shown in my application, No. 230,505, filed March 11, 1887, to which reference is hereby made.

I claim—

1. A pulley provided with a series of arms arranged to form a polygonal figure at the center, and provided with a clamp surrounding the polygonal figure, substantially as and for the purposes specified.

2. A pulley provided with a series of arms arranged to form a polygonal figure at the center, and the polygonal figure formed being surrounded by the adjustable clamp, consisting of the straps D and the nuts $d$, substantially as and for the purposes specified.

3. The combination of the rim A, arms B, attached to the rim, and arranged to form a polygonal figure at the center of the pulley, straps D, surrounding the polygonal figure and provided with nuts $d$, and bushings E, fitting within the polygonal figure, substantially as and for the purposes specified.

4. The combination, with a wheel-rim having arms surrounding a central polygonal space, of a split bushing having a polygonal surface inclosed by said arms, substantially as described.

5. The combination, with a wheel-rim having arms extending inwardly therefrom, said arms being movable at their inner ends, of a split bushing and a clamp engaging the arms to draw them to the bushing.

6. A split rim having arms attached to the separate portions thereof and extending generally toward the center, a clamp for retaining the inner ends of the arms, and mechanism for locking the parts of the rim together, all constructed, combined, and arranged substantially as described.

7. A pulley consisting of a rim in sections having interlocking ends, retaining pins by which the ends are keyed together, arms extending inward obliquely to radial lines past the center of the wheel, and a clamp for uniting the inner ends of the arms, all constructed, combined, and relatively arranged substantially as described.

WM. R. FEE.

Witnesses:
W. P. GULICK,
A. L. HERRLINGER.